Jan. 17, 1939.    C. A. KOTTERMAN    2,143,919
FAN-COOLED RECTIFIER
Filed April 26, 1937    2 Sheets-Sheet 1
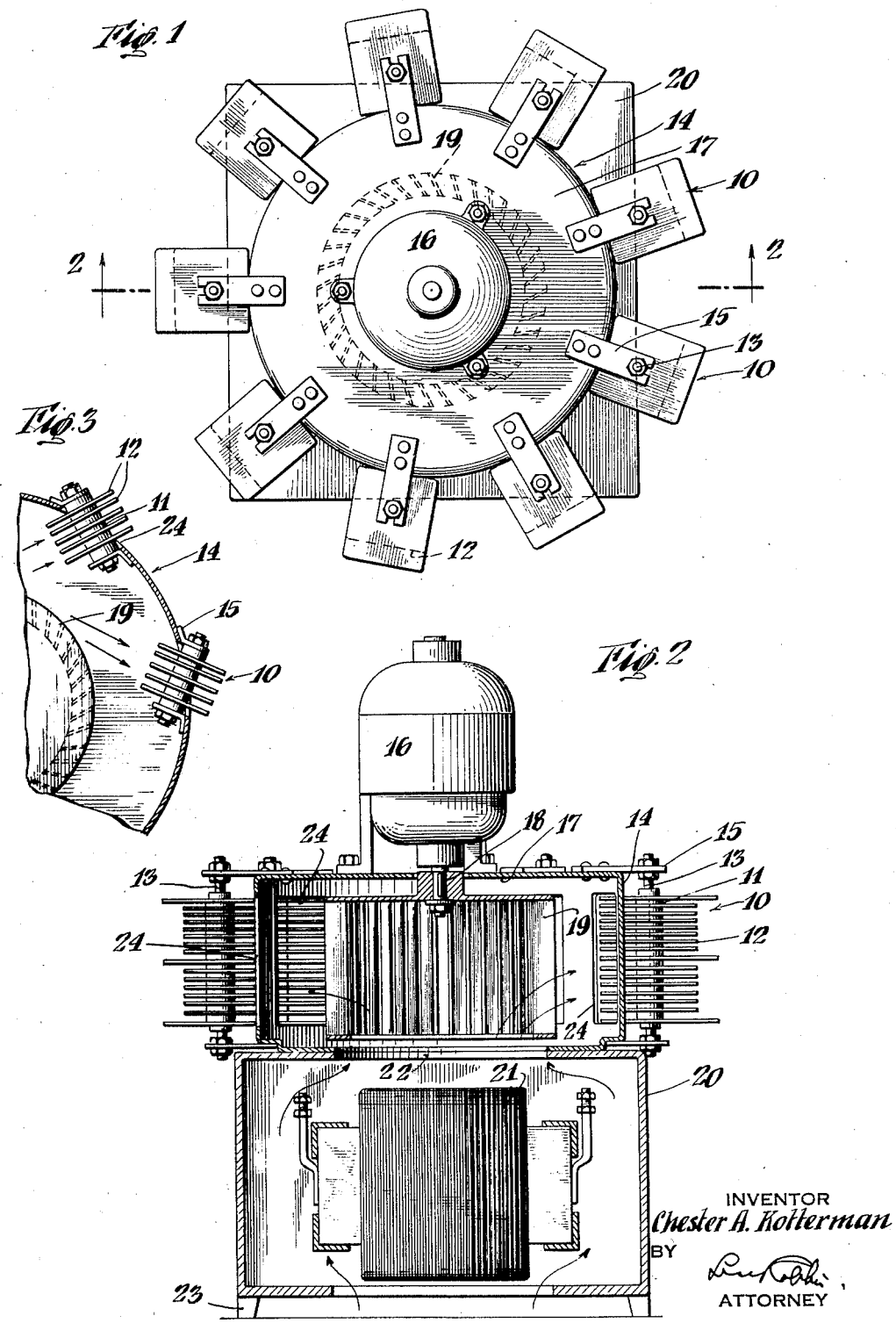
INVENTOR
Chester A. Kotterman
BY
ATTORNEY

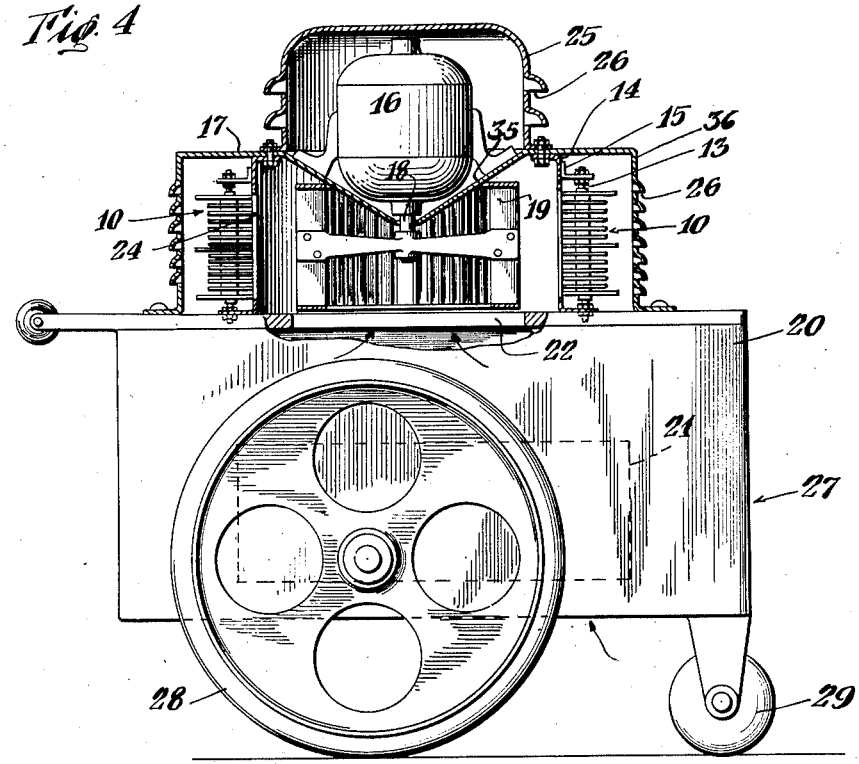
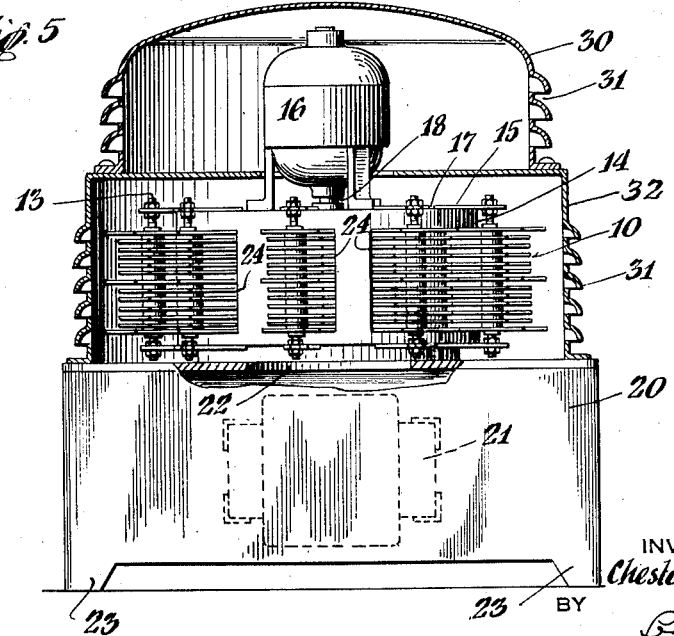

Patented Jan. 17, 1939

2,143,919

UNITED STATES PATENT OFFICE 2,143,919

FAN-COOLED RECTIFIER

Chester A. Kotterman, Indianapolis, Ind., assignor to P. R. Mallory & Co., Inc., Indianapolis, Ind., a corporation of Delaware Application April 26, 1937, Serial No. 139,016

8 Claims. (Cl. 175—366)

This invention relates to rectifiers and means for operating the same.

An object of the invention is to improve the cooling arrangements for rectifiers.

Other objects of the invention will be apparent from the following description and accompanying drawings taken in connection with the appended claims.

The invention comprises the features of construction, combination of elements, arrangement of parts and methods of manufacture and operation referred to above or which will be brought out and exemplified in the disclosure hereinafter set forth, including the illustrations in the drawings.

In the drawings:

Figure 1 is a top view of a fan-cooled rectifier unit embodying features of the present invention;

Figure 2 is a vertical section of said rectifier unit;

Figure 3 illustrates a modified rectifier mounting;

Figure 4 is a side view of a portable unit; and

Figure 5 is a side view, partly in section, of a stationary unit in a housing.

According to one aspect of the present invention cooling of dry-disc rectifiers is effected by a novel fan cooling arrangement wherein the rectifiers are disposed about the periphery of a blower fan.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawings the rectifiers 10 each comprise a series of alternate rectifier discs 11 and radiator plates 12 held together by bolts 13. Rectifiers 10 may, for instance, be of the type described in Ruben Patents 1,751,359; 1,751,361 and 1,751,363 issued March 18, 1930 and others.

The rectifiers 10 can be supported about the periphery of a cylindrical or polygonal metal housing 14 by brackets 15, a series of openings 24 being provided in the wall of housing 14 directly behind the rectifier "stacks" 10.

An electric motor 16 is mounted above the center of closed top wall 17 of housing 14 with its driving shaft 18 passing downward into the housing. A centrifugal blower fan 19 is mounted on shaft 18 within the housing 14.

The fan housing 14 may be mounted in any desired manner. In order to make the most effective use of the cooling air currents induced by the fan it will frequently be desirable to mount other electrical equipment which requires cooling in the path of the air currents. Transformers are commonly used in conjunction with the rectifiers and I find it usually desirable to mount the transformers for cooling.

As shown in the drawings fan housing 14 is mounted on top of a rectangular housing 20 enclosing a transformer 21 mounted therein by suitable brackets. A considerable amount of free space is provided around transformer 21 for adequate air circulation and a circular opening 22, corresponding in diameter to fan 19, is provided in the top of housing 20 to allow free passage of air to the inside of the fan. The housing 20 is mounted in spaced relation to the floor by legs 23 (or provided with air inlet ports) so as to allow cooling air to enter at the base of the unit.

In operation the motor 16 drives the blower fan 19 which draws cooling air in at the base of the unit past transformer 21, thereby cooling it, and then forces the air, still relatively cool, out through all of openings 24 and between the radiator fins 12 of rectifiers 10 thereby effecting cooling of the rectifiers. By this arrangement a large number of rectifiers are efficiently cooled by a single small blower. The structure is simple, economical and compact.

Figure 3 shows a modification of the rectifier mounting wherein the rectifier "stacks" 10 are suspended with their axes horizontal and their radiator plates 12 are in planes tangential to the periphery of the fan 19. Since the discharge from the blower fan 19 is issued forth in a manner more nearly tangential than radial to the fan this arrangement affords a somewhat more direct line of passage for the outgoing air. The rectifiers may be mounted entirely or partly inside the housing wall 14 to afford protection for the rectifiers and associated wires.

The rectifier cooling means lends itself to convenient mounting in portable or stationary equipment, as illustrated in Figures 4 and 5.

Figure 4 shows the unit mounted in a portable truck 27 suitable for charging storage batteries on railroad cars and the like. In this arrangement it will be noted that a conical air deflector 35 to equalize the air distribution through the rectifier radiators is provided in the center of the top wall of the fan housing, the conical deflector 35 extending downward inside the fan blades. External covers 25 and 36 conceal the motor and rectifiers and are provided with suitable air outlet ports 26. The air intake is underneath the truck 27. Wheels 28 and 29 enable the truck to be moved from place to place as required.

Figure 5 shows the unit mounted for use and provided with a suitable dome-shaped motor cover 30 and a rectifier cover 32 having air outlet ports 31.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A fan-cooled rectifier unit comprising a blower fan, a cylindrical or polygonal housing therefor having air outlets disposed around its periphery, dry disc rectifiers set into said openings and means for uniformly discharging the air through the rectifiers.

2. A fan-cooled rectifier unit comprising a centrifugal type blower fan and a series of dry disc rectifiers disposed about its periphery, said rectifiers having radiator fins thereon.

3. A fan-cooled rectifier unit comprising a centrifugal type blower fan and a series of dry disc rectifiers disposed about its periphery, said rectifiers having radiator fins thereon, said fins being disposed in planes substantially tangential to the periphery of said fan.

4. A portable fan-cooled rectifier unit comprising a blower fan, a housing therefor, an air inlet opening underneath said housing, the side walls of said housing being provided with a plurality of air outlet ports, and dry disc rectifiers disposed adjacent said ports in the path of outgoing air currents delivered through said ports by said fan, and vented housing covering said unit.

5. A fan cooled rectifier unit comprising a drum member having a plurality of windows around the peripheral wall thereof, dry disc rectifiers mounted in said windows in the path of air currents passing through said windows and fan means arranged to develop a pressure differential between the interior and the exterior of said drum, whereby to produce air currents through said windows.

6. A fan-cooled rectifier unit comprising a wall having a plurality of individual windows therein, a multiple dry-disc rectifier mounted in each of said windows and a fan arranged so as to develop a pressure differential between the two sides of said wall and produce cooling air currents through said windows and around the surfaces of said rectifiers.

7. A fan-cooled rectifier unit comprising a wall having a plurality of individual windows therein, a multiple dry-disc rectifier mounted in each of said windows and a fan arranged so as to develop a pressure differential between the two sides of said wall and produce cooling air currents through said windows and around the surfaces of said rectifiers, said rectifiers each comprising a stack of rectifier discs interposed with larger-sized heat radiating plates in spaced parallel planes, the planes of said heat radiating plates being substantially parallel to the natural path of flow of said air currents through said windows.

8. A fan-cooled rectifier unit comprising a wall having a circular series of windows therein, a multiple dry-disc rectifier mounted in each of said windows and a fan arranged so as to develop a pressure differential between the two sides of said wall and produce cooling air currents through said windows and around the surfaces of said rectifiers.

CHESTER A. KOTTERMAN.